US010620858B2

(12) United States Patent
Yeh

(10) Patent No.: US 10,620,858 B2
(45) Date of Patent: Apr. 14, 2020

(54) DATA STORAGE METHOD, MEMORY STORAGE DEVICE AND MEMORY CONTROL CIRCUIT UNIT

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

(*) Notice: Subject to any disclaimer, the term of this patent is extended or adjusted under 35 U.S.C. 154(b) by 514 days.

(21) Appl. No.: 15/413,427

(22) Filed: Jan. 24, 2017

(65) Prior Publication Data

US 2018/0143778 A1 May 24, 2018

(30) Foreign Application Priority Data

Nov. 23, 2016 (TW) .............................. 105138516 A

(51) Int. Cl.
*G06F 3/06* (2006.01)
*G06F 12/02* (2006.01)

(52) U.S. Cl.
CPC .......... *G06F 3/0631* (2013.01); *G06F 3/0617* (2013.01); *G06F 3/0652* (2013.01); *G06F 3/0679* (2013.01); *G06F 3/0688* (2013.01); *G06F 12/0246* (2013.01); *G06F 2212/1032* (2013.01); *G06F 2212/1044* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 6,286,016 B1* | 9/2001 | Heller | ................ | G06F 12/0269 |
| 2014/0240335 A1* | 8/2014 | Hu | ...................... | G06F 12/0246 |
| | | | | 345/543 |
| 2014/0351486 A1* | 11/2014 | Baryudin | .............. | G06F 3/0619 |
| | | | | 711/103 |
| 2016/0283161 A1* | 9/2016 | Mielke | ................. | G06F 3/0679 |
| 2017/0123915 A1* | 5/2017 | Nguyen | ............. | G06F 11/1092 |

\* cited by examiner

*Primary Examiner* — Tracy C. Chan
(74) *Attorney, Agent, or Firm* — JCIPRNET

(57) ABSTRACT

A data storage method, a memory storage device and a memory control circuit unit are provided. The method includes: determining a first space in a first physical unit of a rewritable non-volatile memory module; and storing at least part of data stored in at least one physical unit of the rewritable non-volatile memory module to a second space in the first physical unit, and the second space is not belonging to the first space, and the first space is for ensuring that valid data stored in at least one second physical unit among the at least one physical unit can be stored to the first physical unit. Therefore, it is ensured that at least one spare physical unit of the memory storage device can be released by a data merging operation of multiple source nodes.

21 Claims, 15 Drawing Sheets

DATA STORAGE METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 105138516, filed on Nov. 23, 2016. The entirety of the above-mentioned patent application is hereby incorporated by reference herein and made a part of this specification.

BACKGROUND

1. Technology Field

The disclosure relates to a memory management mechanism. More particularly, the disclosure relates to a data storage method, a memory storage device, and a memory control circuit unit.

2. Description of Related Art

The markets of digital cameras, mobile phones, and MP3 players have expanded rapidly in recent years, resulting in escalated demand for storage media by consumers. The characteristics of data non-volatility, low power consumption, compact size and no mechanical structure make a rewritable non-volatile memory module (e.g., a flash memory) ideal for being built in the portable multi-media devices as cited above.

In general, when a memory device is manufactured, a default number of spare physical blocks are arranged in the memory device. One of the spare physical blocks is used to store data as the data is about to store. However, as more and more data is stored in the memory device, more and more spare physical blocks are used and the number of spare physical blocks is gradually decreased. When the number of spare physical blocks in the memory device is decreased to a specific number, the memory device may execute a data merging operation (also referred to as a garbage collection operation) in an attempt to release new spare physical blocks.

During a data merging operation, the memory device collects valid data from one or more source nodes (e.g., a source node may be a physical block of the memory device) and the collected data is stored to a recycling node (e.g., a recycling node may also be a physical block of the memory device). If the valid data stored by a specific physical block (i.e., a source node) have been all collected, the physical block may be erased and identified as a new spare physical block. However, in some cases, if the number of source nodes and the collected data is not properly arranged, there may not be any physical blocks that can be erased when the recycling node is filled. In other words, in this case, the executed data merging operation may not release any new spare physical block so that the memory device cannot operate normally.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure is directed to a data storage method, a memory storage device, and a memory control circuit unit capable of ensuring that the memory storage device can release at least one spare physical unit in a data merging operation of multiple source nodes.

In an exemplary embodiment of the disclosure, a data storage method for a rewritable non-volatile memory module having a plurality of physical units is provided, wherein the data storage method includes: configuring a first space in a first physical unit among the physical units; and storing at least part of data stored in at least one physical unit among the physical units to a second space in the first physical unit, wherein the second space is not belonging to the first space, and the first space is for ensuring that valid data stored by at least one second physical unit among the at least one physical unit can be stored to the first physical unit.

In another exemplary embodiment of the disclosure, a memory storage device that includes a connection interface unit, a rewritable non-volatile memory module, and a memory control circuit unit is provided. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to configure a first space in a first physical unit among the physical units. The memory control circuit unit is further configured to issue a first write command sequence which instructs to store at least part of data stored in at least one physical unit among the physical units to a second space in the first physical unit, wherein the second space is not belonging to the first space, and the first space is for ensuring that valid data stored by at least one second physical unit among the at least one physical unit can be stored to the first physical unit.

In another exemplary embodiment of the disclosure, a memory control circuit unit configured to control a rewritable non-volatile memory module having a plurality of physical units is provided. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to configure a first space in a first physical unit among the physical units. The memory management circuit is further configured to issue a first write command sequence which instructs to store at least part of data stored in at least one physical unit among the physical units to a second space in the first physical unit, wherein the second space is not belonging to the first space, and the first space is for ensuring that valid data stored by at least one second physical unit among the at least one physical unit can be stored to the first physical unit.

In view of the above, by configuring the first space in the first physical unit reserved for the data from the second physical unit, it is ensured that at least one spare physical unit of the memory storage device can be released in a data merging operation of multiple source nodes in the present disclosure.

In order to make the aforementioned and other features and advantages of the disclosure comprehensible, several exemplary, embodiments accompanied with figures are described in detail below.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
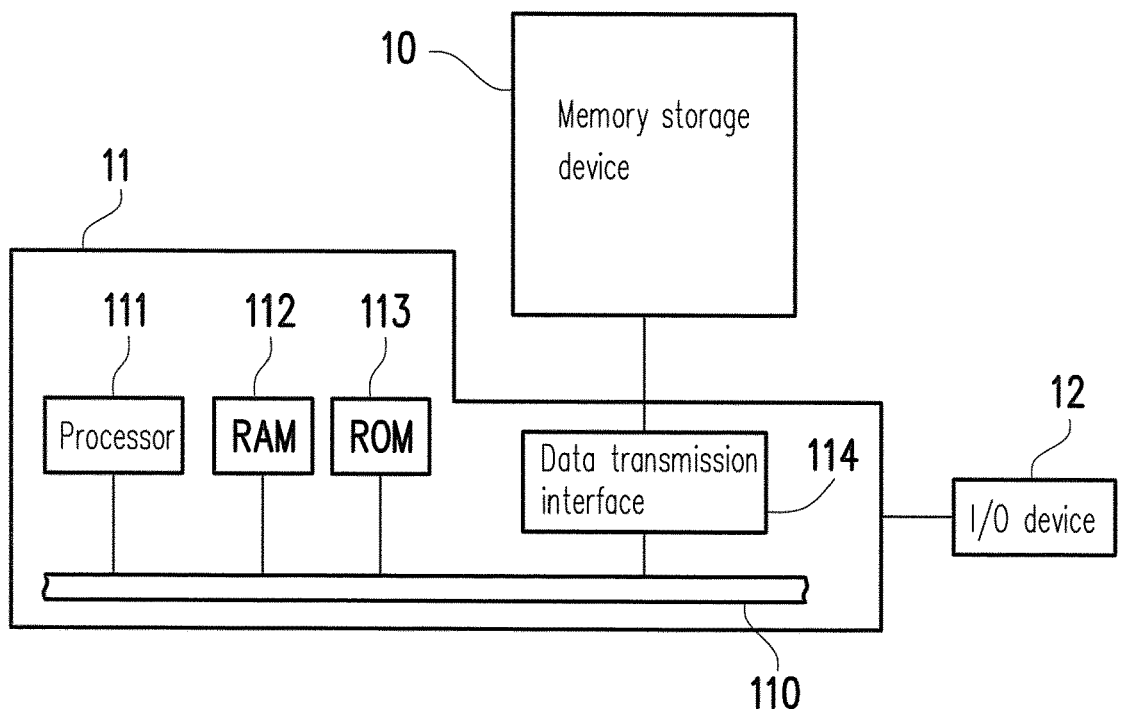
FIG. 1 is a schematic diagram illustrating a host system, a memory storage device and an input/output (I/O) device according to an exemplary embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

Embodiments of the disclosure may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more," and "at least one" can be used interchangeably herein.

A memory storage device (also referred to as a memory storage system) typically includes a rewritable non-volatile memory module and a controller (also referred to as a control circuit). The memory storage device is usually used together with a host system, such that the host system can write data into or read data from the memory storage device.

Figure 2:
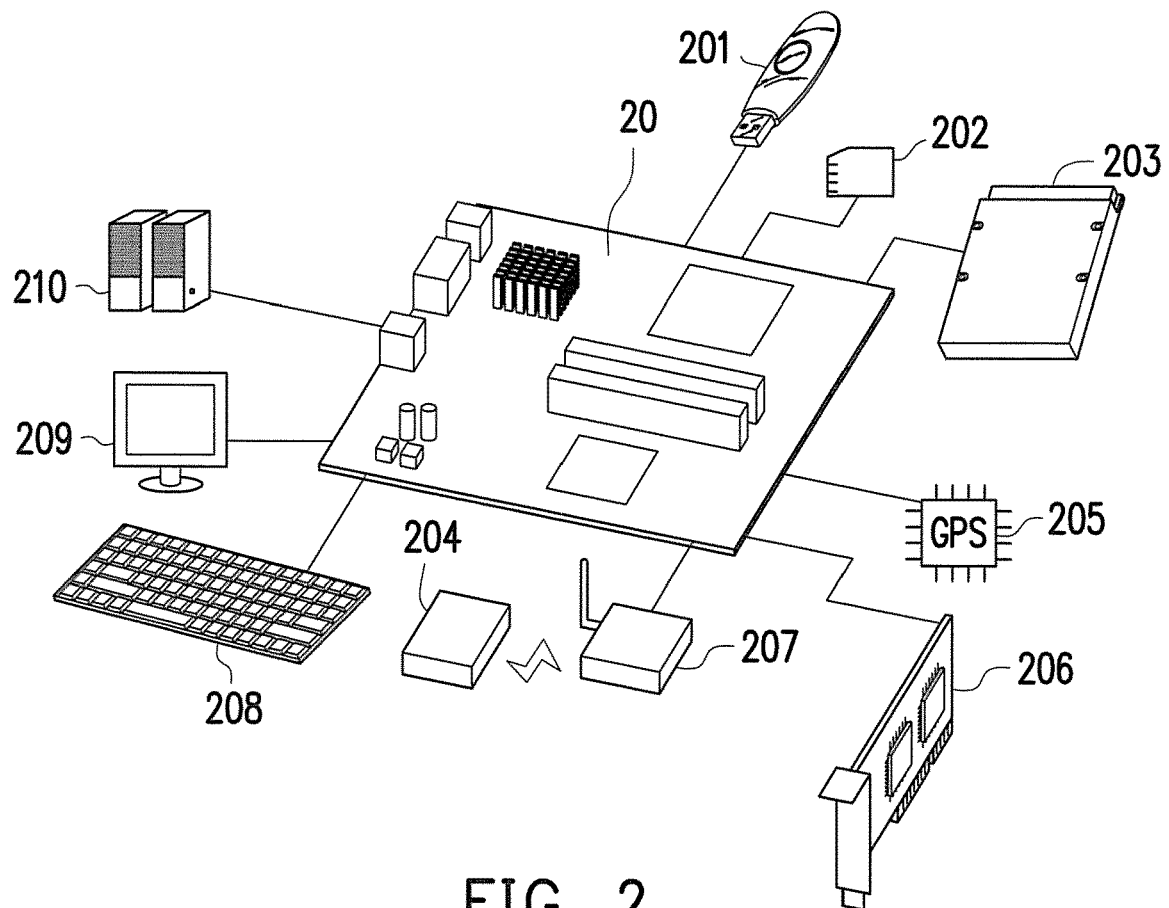
FIG. 2 is a schematic diagram illustrating a host system, a memory storage device and an I/O device according to another exemplary embodiment of the disclosure.

FIG. 1 is a schematic diagram illustrating a host system, a memory storage device and an input/output (I/O) device according to an exemplary embodiment of the disclosure. FIG. 2 is a schematic diagram illustrating a host system, a memory storage device and an I/O device according to another exemplary embodiment of the disclosure.

Reference to FIGS. 1 and 2, a host system 11 generally includes a processor 111, a random access memory (RAM) 112, a read only memory (ROM) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 may store data into the memory storage device 10 or read data from the memory storage device 10 through the data transmission interface 114. Further, the host system 11 is coupled to an I/O device 12 through the system bus 110. For example, the host system 11 can transmit output signals to the I/O device 12 or receive input signals from the I/O device 12 through the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a Solid State Drive (SSD) 203 or a wireless memory storage device 204. The wireless memory storage device 204 may be, for example, a memory storage device based on wireless communication technologies, such as a Near Field Communication (NFC) memory storage device, a Wireless Fidelity (WiFi) memory storage device, a Bluetooth memory storage device, a Bluetooth low energy (BLE) memory storage device (e.g., iBeacon). Further, the main board 20 may also be coupled to I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 through the wireless transmission device 207.

Figure 3:
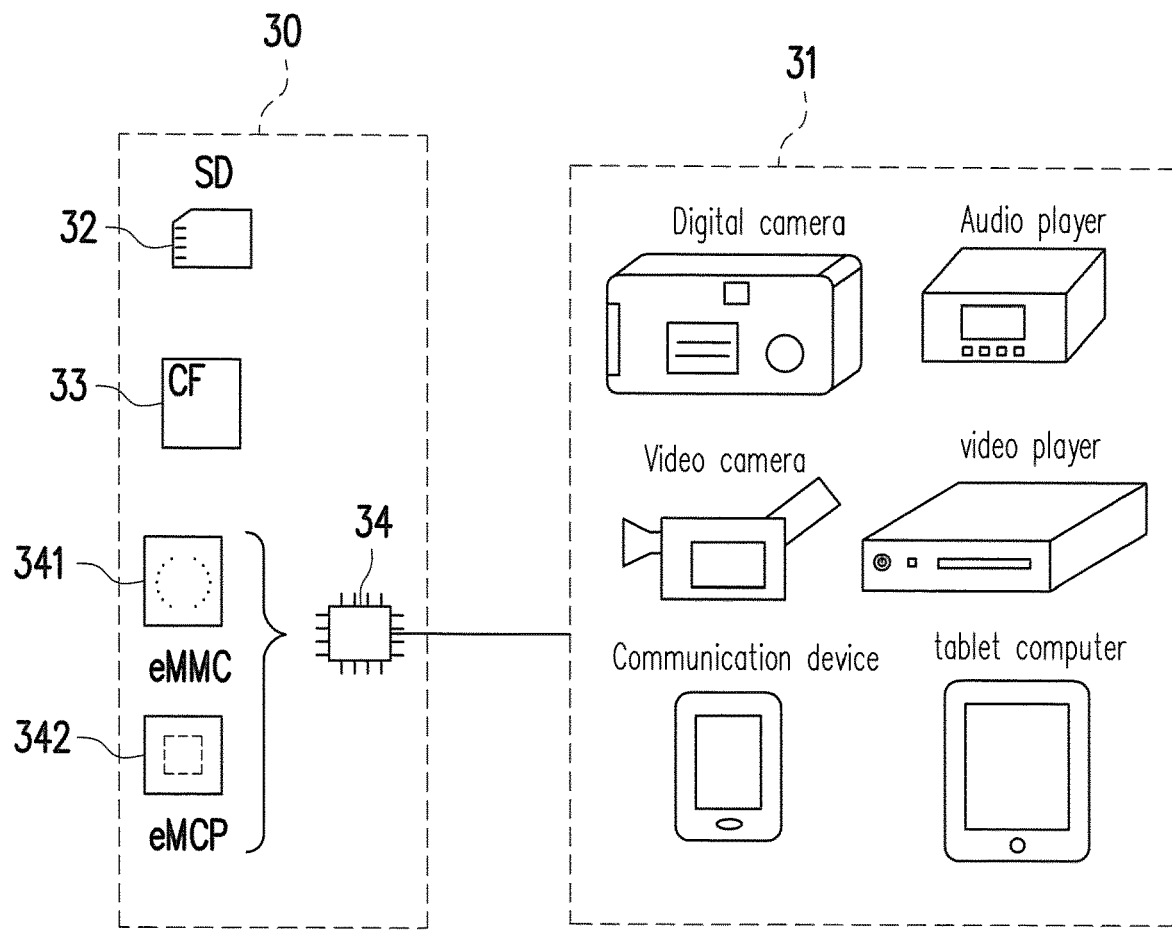
FIG. 3 is a schematic diagram illustrating a host system and a memory storage device according to another exemplary embodiment of the disclosure.

In an exemplary embodiment, aforementioned host system may be any system capable of substantially cooperating with the memory storage device to store data. Although the host system is illustrated as a computer system in foregoing exemplary embodiment, nonetheless, FIG. 3 is a schematic diagram illustrating a host system and a memory storage device according to another exemplary embodiment of the disclosure. Please referring to FIG. 3, in another exemplary embodiment, a host system 31 may also be a system including a digital camera, a video camera, a communication device, an audio player, a video player or a tablet computer, whereas a memory storage device 30 can be various non-volatile memory storage devices used by the host system 31, such as a the secure digital (SD) card 32, a compact flash (CF) card 33 or an embedded storage device 34. The embedded storage device 34 includes various embedded storage devices capable of directly coupling a memory module onto a substrate of the host system, such as an embedded multi media card (eMMC) 341 and/or an embedded multi chip package (eMCP) 342.

Figure 4:
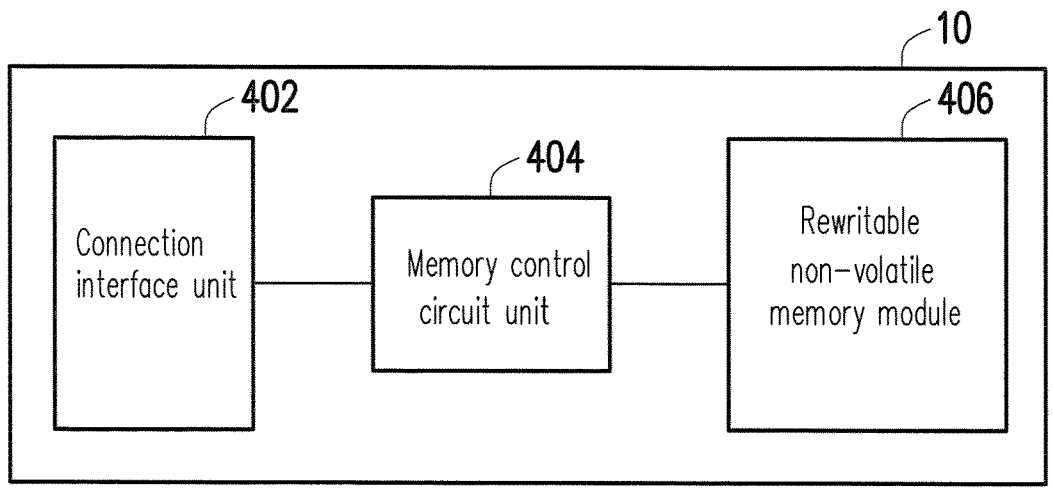
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple the memory storage device 10 with a host system 11. In the present exemplary embodiment, the connection interface unit 402 complies with the serial advanced technology attachment (SATA) standard. However, it should be understood that the disclosure is not limited thereto, and the connection interface unit 402 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory stick (MS) interface standard, the MMC interface standard, the eMMC interface standard, the universal flash storage (UFS) interface standard, the compact flash (CF) standard, the integrated device electronics (IDE) standard, or other suitable standards. The connection interface unit 402 and the memory control circuit unit 404 may be packaged into one chip, or the connection interface unit 402 may be arranged outside a chip having the memory control circuit unit 404.

The memory control circuit unit 404 is configured to execute a plurality of logic gates or control instructions implemented in a hardware form or a firmware form and perform various data operations (e.g., data writing, reading, and erasing) in the rewritable non-volatile memory module 406 according to commands issued by the host system 11.

The rewritable non-volatile memory module 406 is coupled to the memory control circuit unit 404 and configured for storing data written by the host system 11. Here, the rewritable non-volatile memory module 406 may be a single-level cell (SLC) NAND flash memory module (i.e., a flash memory module capable of storing data of 1 bit in one memory cell), a multi-level cell (MLC) NAND flash memory module (i.e., a flash memory module capable of storing data of 2 bits in one memory cell), a trinary-level cell (TLC) NAND flash memory module (i.e., a flash memory module capable of storing data of 3 bits in one memory cell), other flash memory modules, or other memory modules having the same characteristics.

Every memory cell of the rewritable non-volatile memory module 406 stores data of one or more bits based on a voltage change (also referred to as a threshold voltage thereafter). For example, there is a charge trapping layer between a control gate and a tunnel in each memory cell. By applying a write voltage to the control gate, the amount of electrons in the charge trapping layer can be varied so that the threshold voltage of the memory cell can also be varied. The operation of changing the threshold voltage of the memory cell is also referred to as "writing data to a memory cell" or "programming a memory cell". With the variation of the threshold voltage, each memory cell in the rewritable non-volatile memory module 406 includes a plurality of storage states. By applying the read voltage, to which storage state that a memory cell belongs can be determined and one or more bits stored in the memory cell can be accessed accordingly.

In the present exemplary embodiment, the memory cells of the rewritable non-volatile memory module 406 constitute a plurality of physical programming units, and the physical programming units constitute a plurality of physical erasing units. For example, the memory cells on the same word line may constitute one or more physical programming units. If each memory cell is capable of storing data of at least 2 bits, the physical programming units on the same word line can be classified into at least the lower physical programming units and the upper physical programming units. For example, the least significant bit (LSB) of a memory cell belongs to the lower physical programming unit and the most significant bit (MSB) of a memory cell belongs to the upper physical programming unit. In general, in MLC NAND-type flash memory, the writing speed of the lower physical programming unit is faster than the writing speed of the upper physical programming unit and/or the reliability of the lower physical programming unit is higher than the reliability of the upper physical programming unit.

In the present exemplary embodiment, the physical programming unit is the smallest unit for programming; that is, one physical programming unit is the smallest unit for writing data. One physical programming unit mat be a physical page or a physical sector, for instance. In case that the physical programming unit is the physical page, one physical programming unit usually includes a data bit region and a redundant bit region. The data bit region includes a plurality of physical sectors for storing user data, and the redundant bit region is configured for storing system data such as management data (e.g., ECC codes). In the present exemplary embodiment, the data bit region contains 32 physical sectors, and the size of each physical sector is 512 bytes (512 B). However, in other exemplary embodiments, 8, 16, or more or less number of the physical sectors may be contained in the data bit region, and the size of each physical sector may be larger or smaller. In another aspect, the physical erasing unit is the smallest unit for erasing data. Namely, one physical erasing unit contains the least number of memory cells that are erased all together. The physical erasing unit is physical block, for instance.

Figure 5:
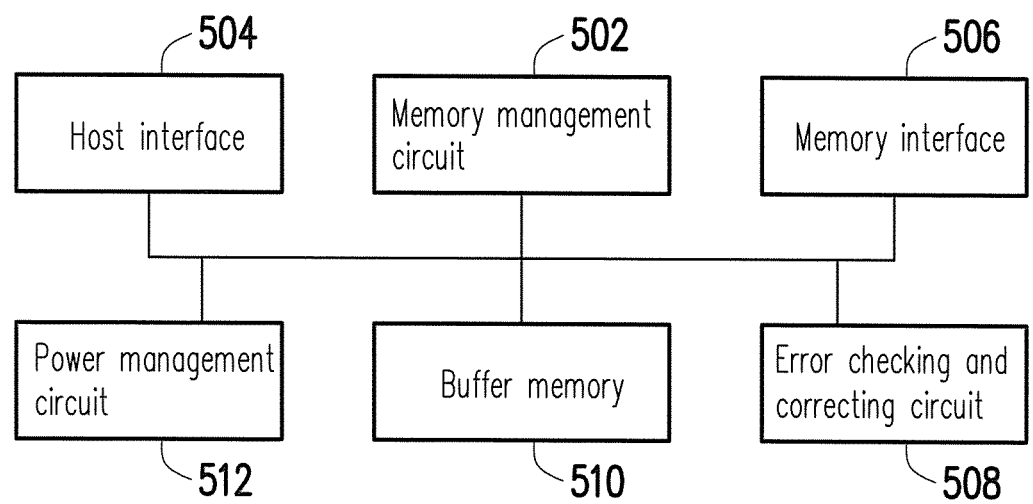
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control the overall operation of the memory control circuit unit 404. Particularly, the memory management circuit 502 has a plurality of control commands; and the control commands are executed to perform various operations such as writing, reading, and erasing data during operation of the memory storage device 10. Hereinafter, description for operations of the memory management circuit 502 is equivalent to description for operations of the memory control circuit unit 404.

In the present exemplary embodiment, the control commands of the memory management circuit 502 are implemented in a firmware form. For instance, the memory management circuit 502 has a microprocessor unit (not shown) and a read-only memory (ROM, not shown), and these control instructions are burnt into the ROM. When the memory storage device 10 is in operation, the control commands are executed by the microprocessor unit to perform operations such as write, read, and erase data.

In another exemplary embodiment, the control commands of the memory management circuit 502 may also be stored in a specific area of the rewritable non-volatile memory module 406 (e.g., a system area of a memory module exclusively used for storing system data) in form of program codes. Additionally, the memory management circuit 502 has a microprocessor unit (not shown), a ROM (not shown), and a RAM (not shown). In particular, the ROM has boot codes, and when the memory control circuit unit 404 is enabled, the microprocessor unit first executes the boot codes to load the control instructions stored in the rewritable non-volatile memory module 406 into the RAM of the memory management circuit 502. The microprocessor unit then runs the control commands to perform operations such as write, read, and erase data.

Moreover, the control commands of the memory management circuit 502 may also be implemented in a hardware form according to another exemplary embodiment. For instance, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cells of the rewritable non-volatile memory module 406 or a group thereof. The memory writing circuit is configured to issue a write command sequence for the rewritable non-volatile memory module 406 in order to write data into the rewritable non-volatile memory module 406. The memory reading circuit is configured to issue a read command sequence for the rewritable non-volatile memory module 406 in order to read data from the rewritable non-volatile memory module 406. The memory erasing circuit is configured to issue an erase command sequence for the rewritable non-volatile memory module 406 in order to erase data from the rewritable non-volatile memory module 406. The data processing circuit is configured to process both the data to be written into the rewritable non-volatile memory module 406 and the data to be read from the rewritable non-volatile memory module 406. Each of the write command sequence, the read command sequence and the erase command sequence may include one or more program codes or command codes and instruct the rewritable non-volatile memory module 406 to perform the corresponding operations, such as writing, reading and erasing data. In an exemplary embodiment, the memory management circuit 502 may further issue command sequences of other types to the rewritable non-volatile memory module 406 for instructing to execute the corresponding operations.

The host interface 504 is coupled to the memory management circuit 502 and configured to receive and identify commands and data transmitted by the host system 11. Namely, the commands and data from the host system 11 are transmitted to the memory management circuit 504 through the host interface 502. In the present exemplary embodiment, the host interface 504 complies with the SATA standard. However, it should be understood that the present disclosure is not limited thereto, and the host interface 504 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506. Specifically, if the memory management circuit 502 is about to access the rewritable non-volatile memory module 406, the memory interface 506 transmits corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals or data on the bus. The signals or the data may include command codes and programming codes. For example, in the read command sequence, information such as identification codes and memory addresses are included.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and configured to perform an error checking and correcting operation to ensure data accuracy. To be specific, when the memory management circuit 502 receives a writing command from the host system 11, the error checking and correcting circuit 508 generates an error correcting code (ECC) and/or an error detecting code (EDC) for data corresponding to the writing command, and the memory management circuit 502 writes the data corresponding to the writing command and the corresponding ECC code and/or the corresponding EDC code into the rewritable non-volatile memory module 406. Subsequently, when the memory management circuit 502 reads the data from the rewritable non-volatile memory module 406, the ECC and/or the EDC corresponding to the data is also read, and the error checking and correcting circuit 508 executes the error checking and correcting operation on the read data according to the ECC and/or the EDC.

The buffer memory 510 is coupled to the memory management circuit 502 and configured to temporarily store data and commands received from the host system 11 or data received from the rewritable non-volatile memory module 406. The power management circuit 512 is coupled to the memory management circuit 502 and configured to control the power supply of the memory storage device 10.

Figure 6:
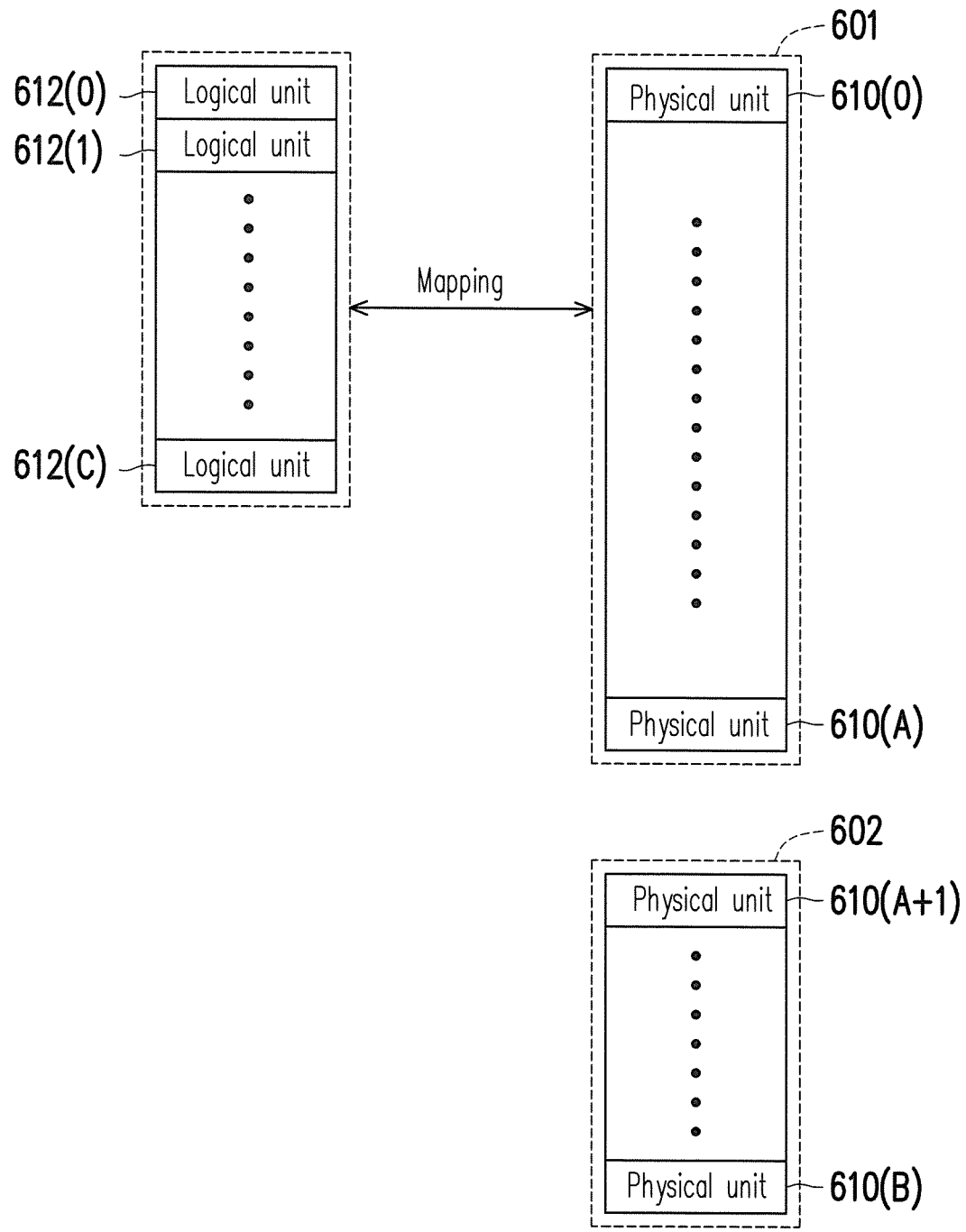
FIG. 6 is a schematic diagrams illustrating management of a rewritable non-volatile memory module according to an exemplary embodiment of the disclosure.

FIG. 6 is a schematic diagrams illustrating management of a rewritable non-volatile memory module according to an exemplary embodiment of the disclosure.

Referring to FIG. 6, the memory management circuit 502 logically groups the physical units 610(0)-610(B) of the rewritable non-volatile memory module 406 into a storage area 601 and a spare area 602. Data is stored in the physical units 610(0)-610(A) of storage area 601. For example, data stored in storage area 601 includes valid data and invalid data. The physical units 610(A+1)-610(B) of spare area 602 are still not used to store data. The memory management circuit 502 may select one physical unit from the physical units 610(A+1) to 610(B) of the spare area 602 and store data from the host system 11 or from other physical units of the storage area 601 to the selected physical unit. At the same time, the selected physical unit is associated with the storage area 601. Furthermore, after erasing one physical unit of the storage area 601, the erased physical unit is reassociated with the spare area 602.

In the present exemplary embodiment, the physical units associated with the spare area 602 are referred to as the spare physical units and the physical units associated with the storage area 601 are referred to as the non-spare physical units. In the present exemplary embodiment, a physical unit is referred to a physical erasing unit. However, in another exemplary embodiment, a physical unit may also include a plurality of physical erasing units.

The memory management circuit 502 configures logical units 612(0)-612(C) for mapping the physical units 610(0) to 610(A) of the storage area 601. In the present exemplary embodiment, every logical unit is referred to a logical address. However, in another exemplary embodiment, a logical unit may also referred to a logical programming unit, a logical erasing unit or be constituted by a plurality of continuous or non-continuous logical addresses. Besides, each one of logical units 612(0) to 612(C) may be mapped to one or more physical units.

The memory management circuit 502 may record the mapping relation of the logical units and the physical units in at least one logical-to-physical mapping table. When the host system 11 is to read data from the memory storage device 10 or to write data to the memory storage device 10, the memory management circuit 502 may execute the data accessing operation on the memory storage device 10 according to the logical-to-physical mapping table.

It is noted that in the following description, some terms may be replaced with corresponding abbreviations for ease of reading (see Table 1).

TABLE 1

| logical-to-physical mapping table | L2P table |
|---|---|
| physical-to-logical mapping table | P2L table |
| rewritable non-volatile memory module | RNVM module |
| physical unit | PU |
| physical erasing unit | PEU |
| physical programming unit | PPU |
| logical unit | LU |
| logical erasing unit | LEU |
| logical programming unit | LPU |
| memory management circuit | MMC |
| memory control circuit unit | MCCU |
| error checking and correcting circuit | ECCC |

In the present exemplary embodiment, the valid data is the newest data belonging to one LU and the invalid data is not the newest data belonging to any LU. For example, if the host system 11 stores new data to a LU and overwrites the old data stored in the LU (i.e., updating data belonging to the LU), the new data stored in the storage area 601 is the newest data belonging to the LU and marked as valid, and the old data being overwritten may be still stored in the storage area 601 but marked as invalid.

In the present exemplary embodiment, if data belonging to a LU is updated, the mapping relation between the LU and a PU storing old data belonging to the LU is removed and the mapping relation between the LU and a PU storing the newest data belonging to the LU is recorded. However, in another exemplary embodiment, if data belonging to a LU is updated, the mapping relation between the LU and the PU storing the old data belonging to the LU can still be maintained.

When the memory storage device 10 is at factory shipping, a total number of PUs belonging to the spare area 602 is a default number (e.g., 30). In the operation of the memory storage device 10, more and more PUs may be selected from spare area 602 and associated with the storage area 601 to store data, such as user data from the host system 11. Therefore, the total number of the PUs belonging to the spare area 602 may be gradually decreased as the memory storage device 10 is used.

In the operation of the memory storage device 10, the MMC 502 updates the total number of the PUs belonging to the spare area 602 continuously. For example, the MMC 502 may determine whether the total number of PUs belonging to the spare area 602 is less than or equal to a threshold value (also referred to as a first threshold value). The first threshold value is a value of, for example, 2 or more (e.g., 10), and the present disclosure is not limited thereto. If the total number of PUs belonging to the spare area 602 is less than or equal to the first threshold value, the MMC 502 may execute a data merging operation. In an exemplary embodiment, the data merging operation is also referred to as a garbage collection operation.

During the data merging operation, the MMC 502 may select at least one PU (also referred to as a source node) from the storage area 601 and try to copy (or move) the valid data from the selected PU to another PU (also referred to as a recycling node). The PU used for storing the copied (or moved) valid data is selected form the spare area 602 and then associated with the storage area 601. If the valid data stored by a PU are all copied (or moved), the PU may be erased and then associated with the spare area 602. In an exemplary embodiment, the operation of associating a PU from the storage area 601 to the spare area 602 is also referred to as the operation of releasing a spare PU. By executing the data merging operation, one or more spare PUs are released and the total number of PUs belonging to the spare area 602 is gradually increased.

After the data merging operation is started, if the PUs belonging to the spare area 602 meets a certain condition, the data merging operation is stopped. For example, the MMC 502 may determine whether the total number of PUs belonging to the spare area 602 is larger than or equal to another threshold value (also referred to as a second threshold value). For example, the second threshold value may be larger than or equal to the first threshold value. If the total number of PUs belonging to the spare area 602 is larger than or equal to the second threshold value, the MMC 502 stops the data merging operation. For example, stopping the data merging operation is referred to as terminating the currently executed data merging operation. After termination of the data merging operation, if the total number of PUs belonging to the spare area 602 is less than or equal to the first threshold value again, the next data merging operation may be executed again for trying to release new spare PUs.

In an exemplary embodiment, the total number of the PUs belonging to the spare area 602 may be recorded in a management table. When a spare PU is released, the MMC 502 may add "1" to an instruction value recorded in the management table, wherein the instruction value corresponds to the total number of PUs belonging to the spare area 602. When a PU is associated with the storage area 601 from the spare area 602 for storing data, the MMC. 502 may decrease the instruction value by "1". In the operation of the memory storage device 10, the MMC 502 may determine whether or not to execute the next data merging operation and/or terminate the currently executed data merging operation based on the instruction value.

Figure 7:
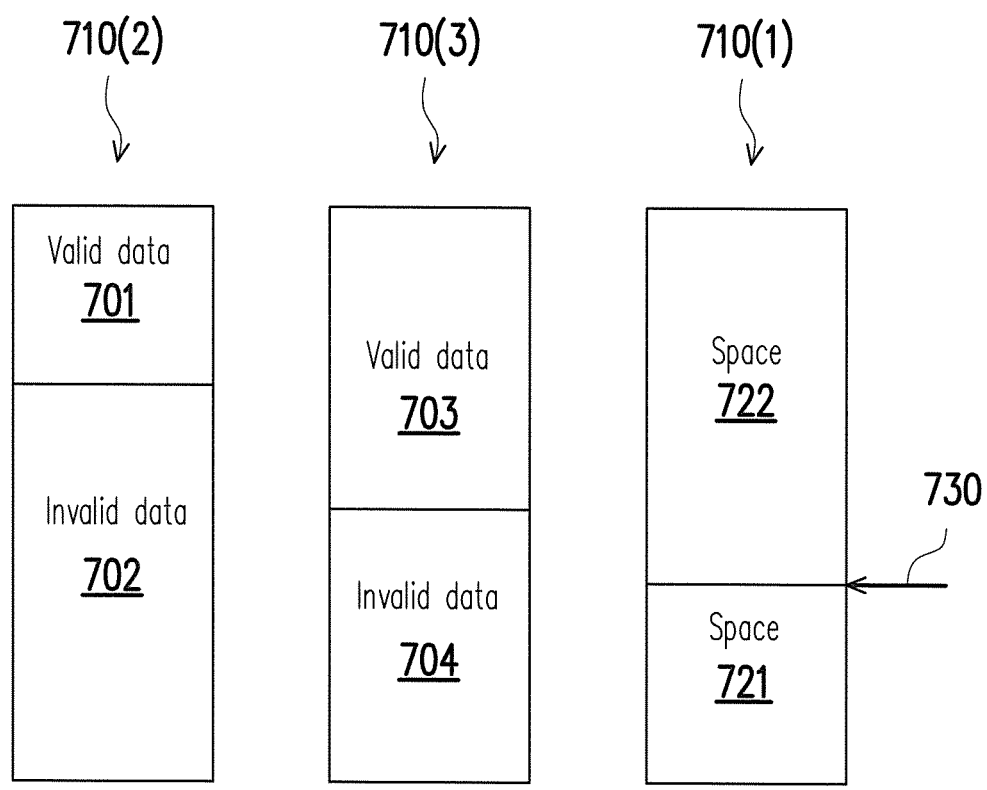
FIG. 7 is a schematic diagram illustrating a pre-process of a data merging operation according to an exemplary embodiment of the disclosure.

FIG. 7 is a schematic diagram illustrating a pre-process of a data merging operation according to an exemplary embodiment of the disclosure.

Referring to FIG. 7, the MMC 502 selects a PU 710(1) (also referred to as first PU) as the recycling node and additionally select at least one PU as the source node before data is actually moved. According to the present exemplary embodiment, the source node includes a PU 710(2) (referred as the second PU) and a PU 710(3) (referred as the third PU). For example, the PU 710(1) is selected from the spare area 602 of FIG. 6, and the PUs 710(2) and 710(3) are selected from the storage area 601 of FIG. 6. It should be noted that, although the number of the second PU and the third PU are both "1" in the present exemplary embodiment, in another exemplary embodiment, the number of the second PUs and the third PUs may both be more than one. The present disclosure is not limited thereto.

The MMC 502 may store at least part of the data stored in the PUs 710(2) and 710(3) to the PU 710(1) after the recycling node and the source nodes are selected. For example, the PU 710(2) stores valid data 701 and invalid data 702, and the PU 710(3) stores valid data 703 and invalid data 704. Thus, during the data merging operation, the valid data 701 and 703 may be collected from the PUs 710(2) and 710(3) and copied to the PU 710(1) for storage. In addition, if all of the valid data stored in any one of the PUs 710(2) and 710(3) is copied into the PU 710(1), then the PU may be erased.

On the other hand, the MMC 502 may configure a space 721 (also referred to as a first space) in the PU 710(1). Besides, a space 722 (also referred to as a second space) is a remaining space not belonging to the space 721 in the PU 710(1). The spaces 721 and 722 respectively include a plurality of physical addresses (or PPUs) with consecutive number and may be used to store the valid data collected in the data merging operation.

In the present exemplary embodiment, the MMC 502 utilizes the index 730 to divide the space 721 and 722 in the PU 710(1). For example, the index 730 may point to a starting physical address of the space 721 (e.g., the physical address with a smallest number in the space 721) or an ending physical address of the space 722 (e.g., the physical address with a largest number in the space 722). Further, in another exemplary embodiment, the MMC 502 may also utilize other means to divide the space 721 and 722 in the PU 7100). For example, the MMC 502 may record the physical addresses included in the spaces 721 and 722 respectively in a table and so on.

In the present exemplary embodiment, the order of the physical address in the space 721 is arranged behind the order of the physical address in space 722. For example, the number of the starting physical address in the space 721 follows behind the number of the ending physical address in the space 722. When the collected data is stored into the PU 710(1), the space 722 is used first (i.e., for storing data). After the space 722 is fully used (e.g., filled), the space 721 is used in continuation (i.e., for storing data).

It is noted that the space 721 is used for ensuring that in the worst case, the valid data 701 in the PU 710(2) can be stored to the PU 710(1) completely such that the PU 710(2) can be erased. For example, the worst case may be that the total data volume of the valid data 701 and 703 exceeds the total capacity of the spaces 721 and 722. In other words, if the space 721 is not reserved for the valid data 701, the PU 710(1) may store only a part of the valid data 701 and a part of the valid data 703 when the PU 710(1) is filled. In this case (i.e., the worst case), both of the PUs 710(2) and 710(3) cannot be erased so that no spare PU is released by the data merging operation.

In an example embodiment, the MMC 502 may configure an initial capacity of the space 721 based on a total data volume of the valid data 701 stored by the PU 710(2), such that the total data volume of the valid data 701 is consistent with the initial capacity of the space 721. For example, the MMC 502 may configure the total data volume of the valid data 701 based on a valid count of the PU 710(2), wherein the valid count corresponds to the total number of the PPUs storing the valid data 701 in the PU 710(2). Based on the valid count, the MMC 502 may set the initial capacity of the space 721 to be the same or close to the total data volume of the valid data 701. In addition, in another exemplary embodiment, the MMC 502 may also verify the valid count by using a P2L table to further verify the total data volume of the valid data 701. It is noted that, it is common knowledge to those skilled in the art that how to estimate the amount of valid data stored in a PU, so that related description thereof is omitted hereinafter.

In an exemplary embodiment, after the PUs 710(2) and 710(3) are selected as the source nodes, the MMC 502 may further determine which of the data volume of the valid data stored in the PUs 710(2) and 710(3) is smaller. For example, as shown in FIG. 7, the data volume of the valid data 701 of the PU 710(2) is smaller than the data volume of the valid data 703 of the PU 710(3), so the initial capacity of the space 721 is configured corresponding to the valid data 701 having the smaller data volume.

It is noted that, the valid data 701 stored in the PU 710(2) and the valid data 703 stored in the PU 710(3) may be stored to the space 722 during the data merging operation. However, the space 721 is used for ensuring that the valid data 701 can be stored to the PU 710(1) completely. Therefore, after the space 722 is filled, the MMC 502 may store data of the valid data 701 that is not yet stored in the PU 710(1) to the space 721 continuously, and the valid data 703 not yet stored in the PU 710(1) is not being stored to the space 721. In this way, it is ensured that the valid data 701 can be stored in the PU 710(1) completely.

In an exemplary embodiment, the space 721 may also be regarded as a reserved space for storing data (i.e., the valid data 701) from the PU 710(2), and the capacity of the space 721 may be dynamically adjusted during data merging operation. For example, in an exemplary embodiment, it is assumed that the initial capacity of the space 721 equals to the total data volume of the valid data 701. In the data merging operation, as more and more data of the valid data 701 is collected and stored to the space 722, the capacity of the space 721 may be gradually decreased since the data volume of data which may be subsequently stored to the space 721 become less and less. In other words, in an exemplary embodiments, the capacity of the space 721 is positively relative to the total data volume of the valid data which is not yet stored to the PU 710(1) in the PU 710(2). In addition, in an exemplary embodiment, if a data stored in the space 722 belongs to the valid data 703, the MMC 502 does not adjust the capacity of the space 721 in response to the storage of the data (since the data volume of data that may be later stored to the space 721 is not decreased). Furthermore, in an exemplary embodiment, if the data stored in the space 722 does not belong to the valid data 701 (or all belong to the valid data 703), the capacity of the space 721 is maintained at the initial capacity of the space 721.

In an exemplary embodiment, the MMC 502 determines whether or not the data currently stored into the space 722 includes the data (also referred to as a first data) from the PU 710(2). For example, the first data is at least part of the valid data 701. The MMC 502 may decrease the capacity of the space 721 if the data currently stored into the space 722 include the first data. For example, the MMC 502 may adjust the capacity of the space 721 from one capacity (also referred to as the first capacity) to another capacity (also referred to as the second capacity), wherein the second capacity is smaller than the first capacity. For example, the MMC 502 may adjust the capacity of the space 721 by adjusting the index 730 to point to another physical address, wherein a difference value between the first capacity and the second capacity may be consistent with the data volume of the first data which is being stored. For example, if the data volume of the first data equals to a total capacity of a default number of the PPUs, the difference value between the first capacity and the second capacity may also be the total capacity of the default number of the PPUs. Besides, if the data currently stored into the space 722 does not include data from the PU 710(2) (e.g., the data currently stored in the space 722 (only) belongs to the valid data 703), the MMC 502 does not decrease the capacity of the space 721 correspondingly. Thus, it is ensured that the space 721 is maintained sufficiently for the remaining data in the valid data 701 that is not yet moved before the valid data 701 is completely stored to the PU 710(1).

FIG. 8A to FIG. 8E are schematic diagrams illustrating a data merging operation according to an exemplary embodiment of the disclosure.

Figure 8A:
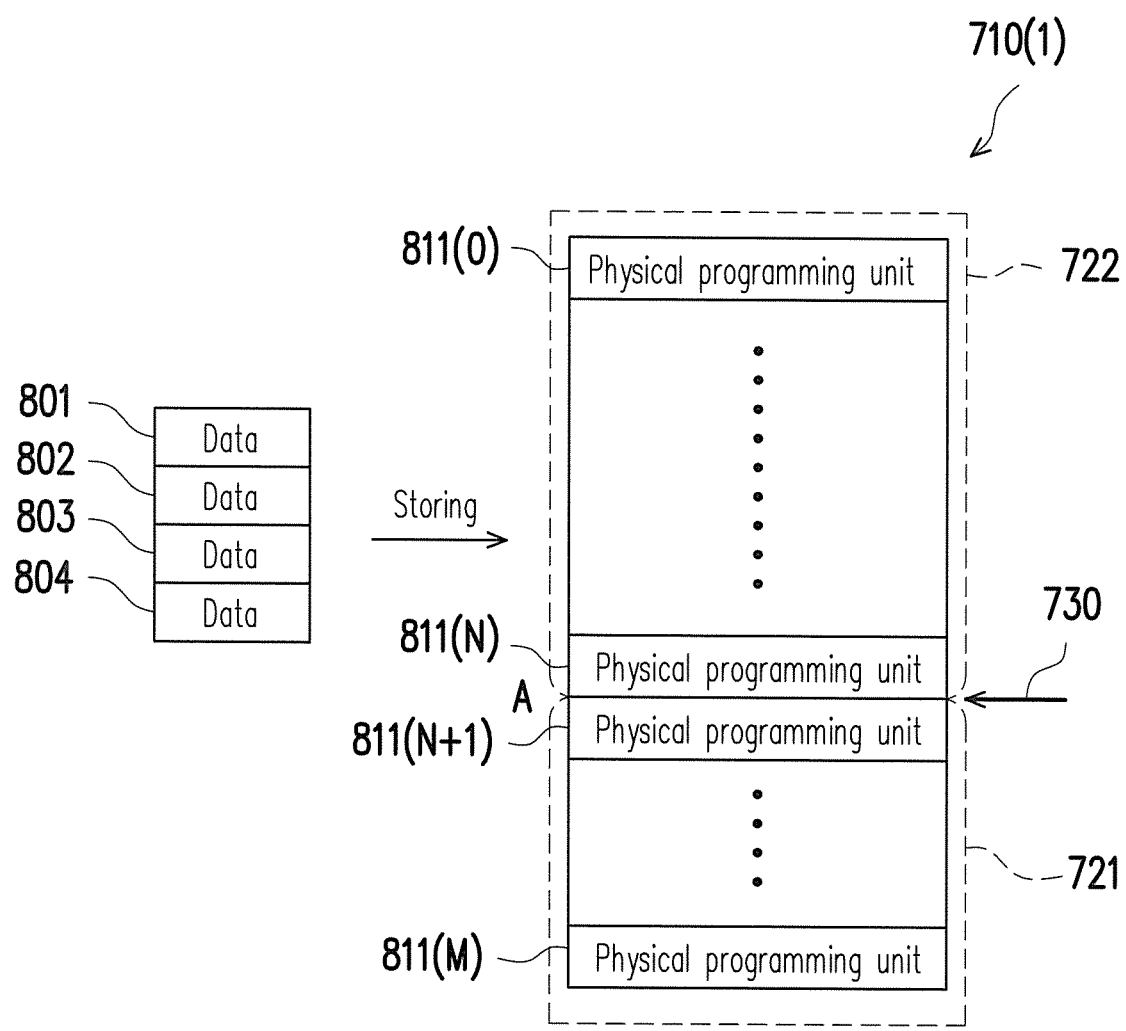
FIG. 8A to FIG. 8E are schematic diagrams illustrating a data merging operation according to an exemplary embodiment of the disclosure.

Referring to FIG. 8A, it is assumed that the space 722 includes PPUs 811(0) to 811(N), and the space 721 includes PPUs 811(N+1) to 811(M). Prior to actually moving data, the index 730 points to a critical point A between the spaces 721 and 722, wherein the critical point A is, for example, the physical address of the PPU 811(N+1). The total capacity of the PPUs 811(N+1) to 811(M) equals to the initial capacity of the space 721 and the total capacity of the PPUs 811(0) to 811(N) equals to the initial capacity of the space 722.

In the data merging operation, the MMC 502 issues at least a read command sequence and at least a write command sequence to the RNVM module 406. The read command sequence instructs to collect data 801 and 803 from the PU 710(2) and to collect data 802 and 804 from the PU 710(3). For example, the data 801 and 803 are part of the valid data 701 and the data 802 and 804 are part of the valid data 703. Additionally, the write command sequence instructs to store the data 801 to 804 to the PU 710(1).

Figure 8B:
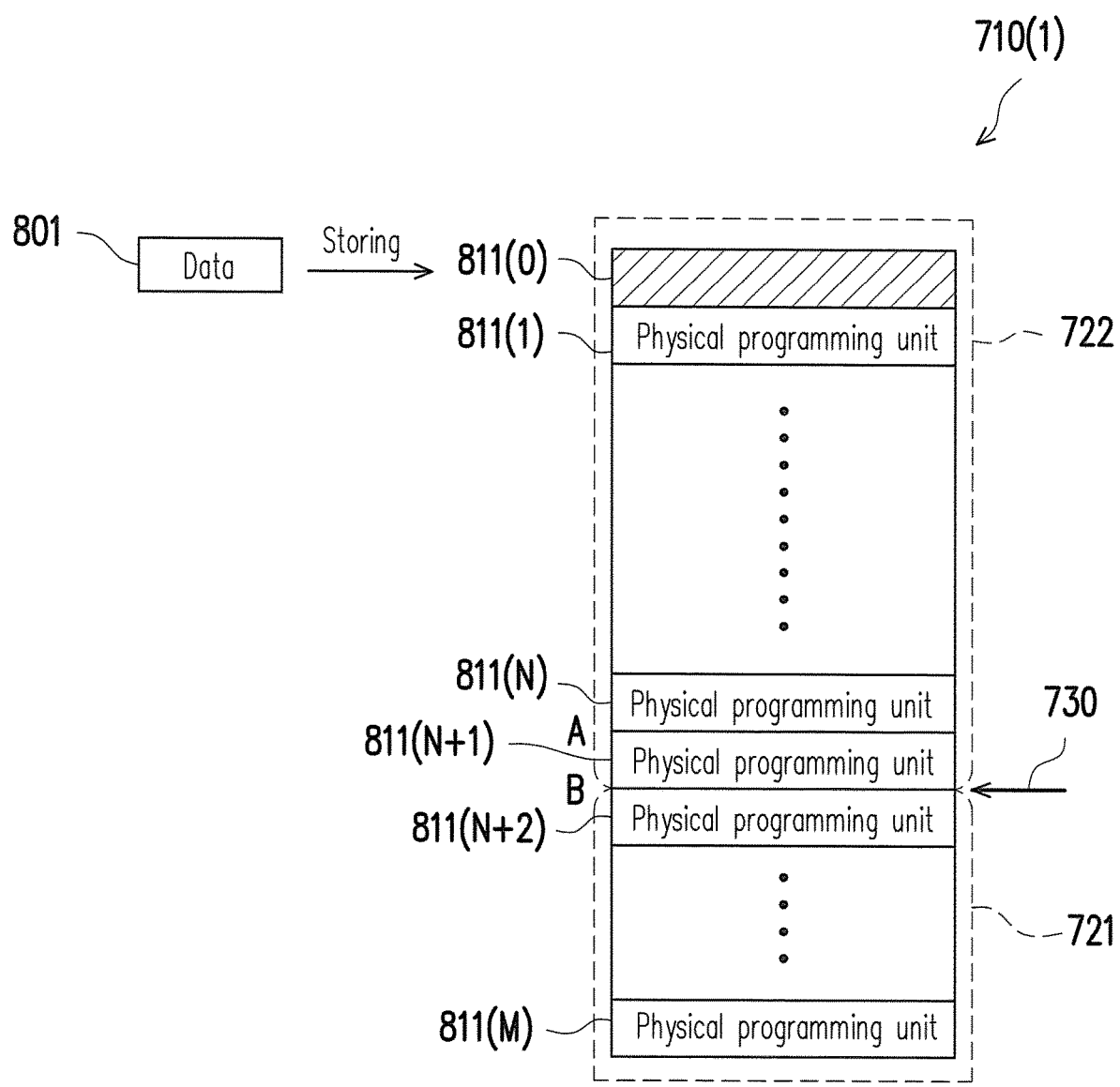

Referring to FIG. 8B, in the data merging operation, the MMC 502 issues a write command sequence that instructs to store the data 801 from the PU 710(2) to the PPU 811(0). Corresponding to the storage of the data 801 to the PPU 811(0), the index 730 is moved from the critical point A to the critical point B such that the starting physical address of the space 721 is changed from the physical address of the PPU 811(N+1) to the physical address of the PPU 811(N+2). In other words, in the operation of FIG. 8B, the difference value between the capacity of the space 721 before adjustment and the capacity of the space 721 after adjustment is consistent with the data volume of the data 801 stored to the space 722, and the difference value and the data volume of the data 801 both correspond to the capacity of one PPU.

Figure 8C:
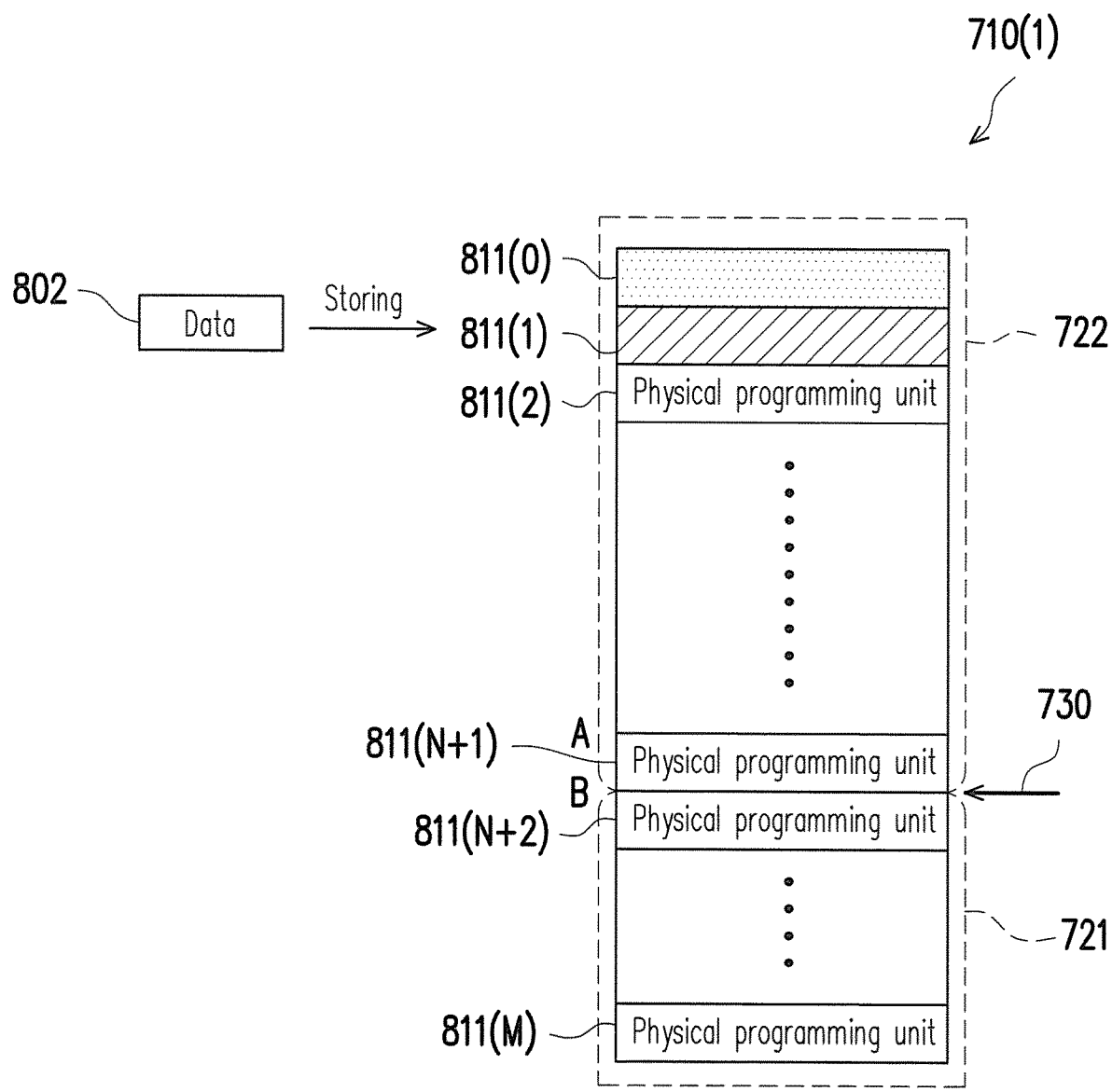

Referring to FIG. 8C, following the operation of FIG. 8B, the MMC 502 issues a write command sequence that instructs to store the data 802 from the PU 710(3) to the PPU 811(1). Corresponding to the storage of the data 802 to the PPU 811(1), the index 730 stays at the critical point B and the capacity of the space 721 is unchanged.

Figure 8D:
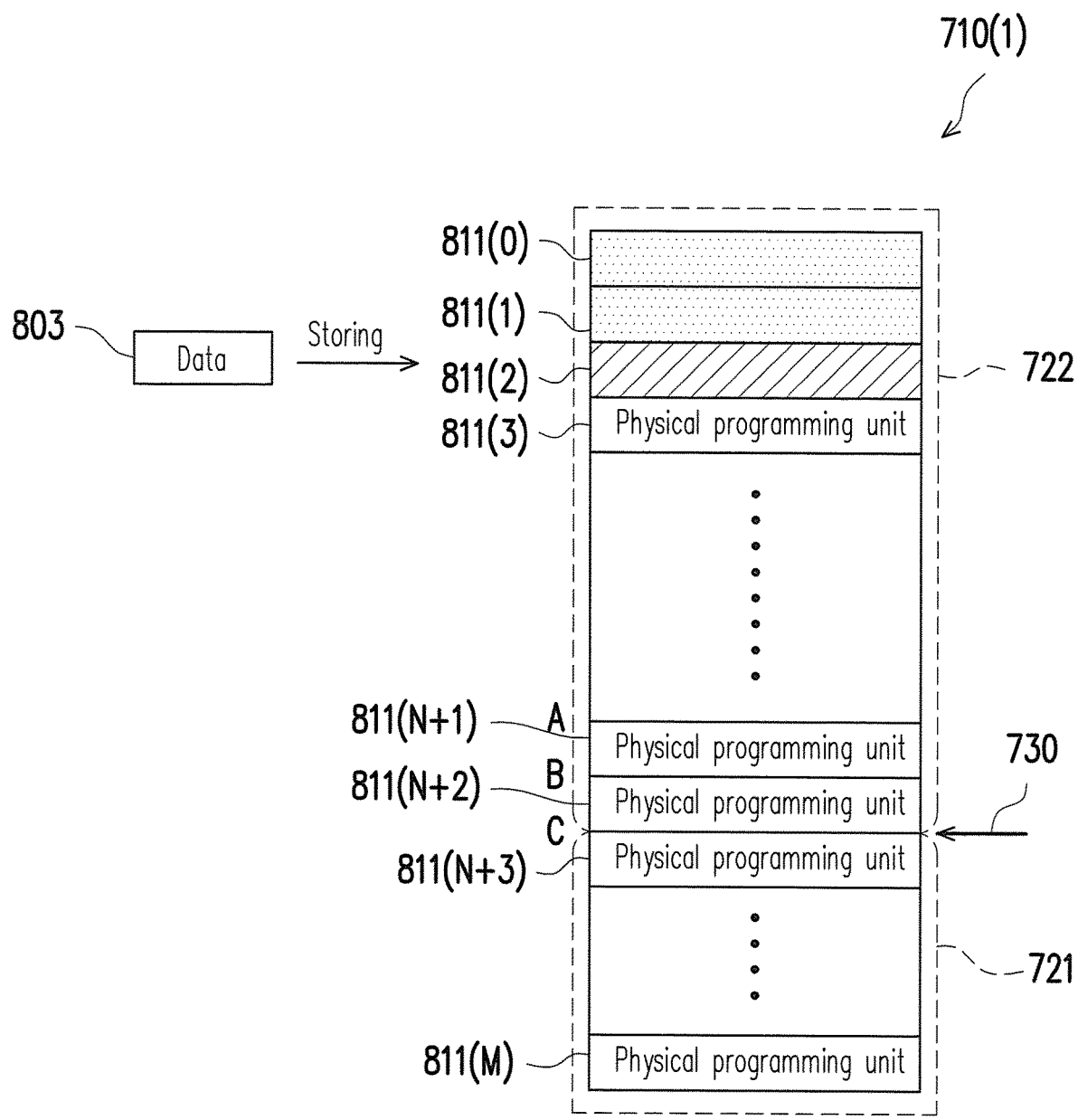

Referring to FIG. 8D, following the operation of FIG. 8C, the MMC 502 issues a write command sequence that instructs to store the data 803 from the PU 710(2) to the PPU 811(2). Corresponding to the storage of the data 803 to the PPU 811(2), the index 730 is moved from the critical point B to the critical point C such that the starting physical address of the space 721 is changed from the physical address of the PPU 811(N+2) to the physical address of the PPU 811(N+3). In other words, in the operation of FIG. 8D, the difference value between the capacity of the space 721 before adjustment and the capacity of the space 721 after adjustment is consistent with the data volume of the data 803 stored to the space 722, and the difference value and the data volume of the data 803 both correspond to the capacity of one PPU.

Figure 8E:
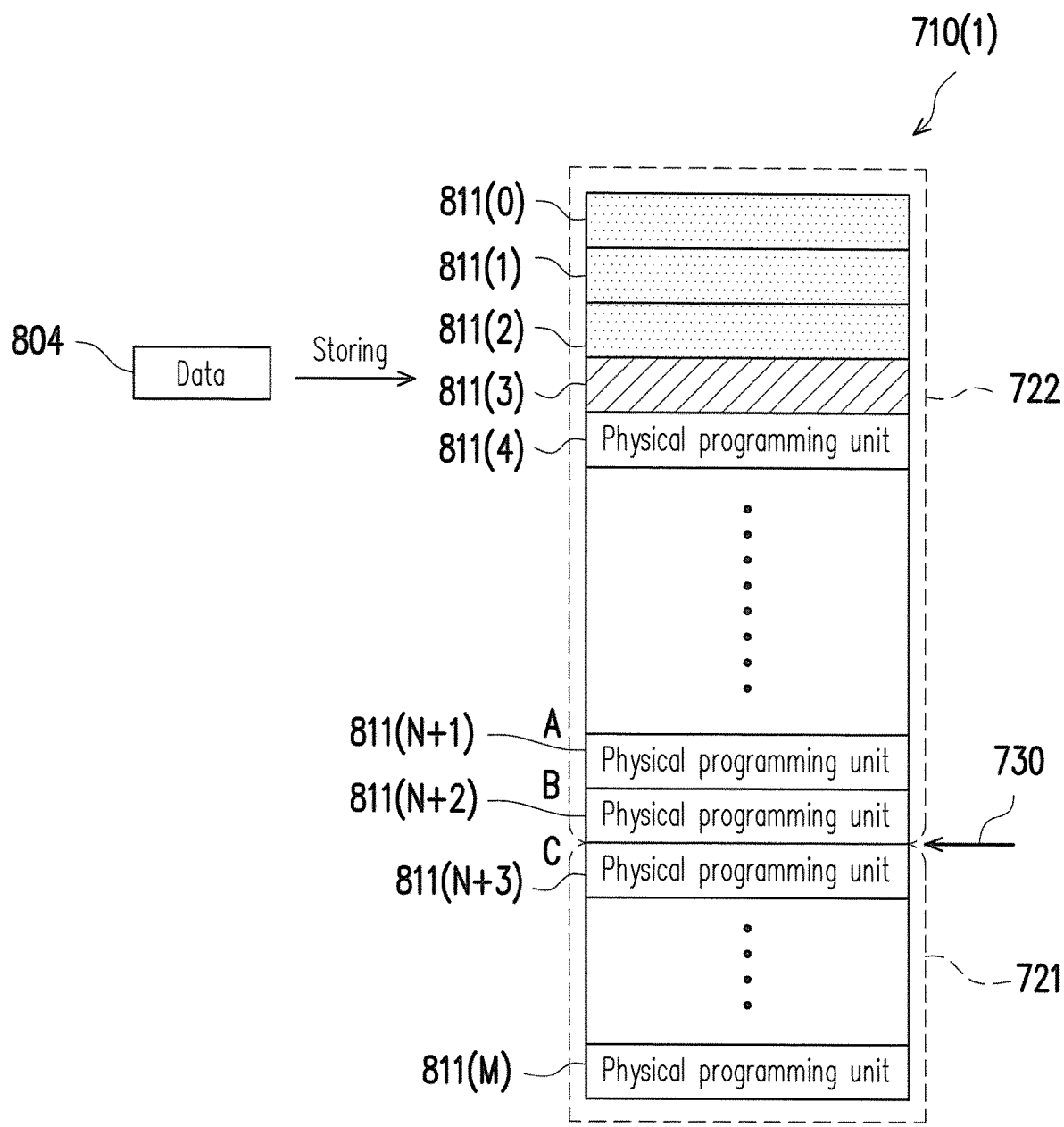

Referring to FIG. 8E, following the operation of FIG. 8D, the MMC 502 issues a write command sequence that instructs to store the data 804 from the PU 710(3) to the PPU 811(3). Corresponding to the storage of the data 804 to the PPU 811(3), the index 730 stays at the critical point C and the capacity of the space 721 is unchanged.

Figure 8F:
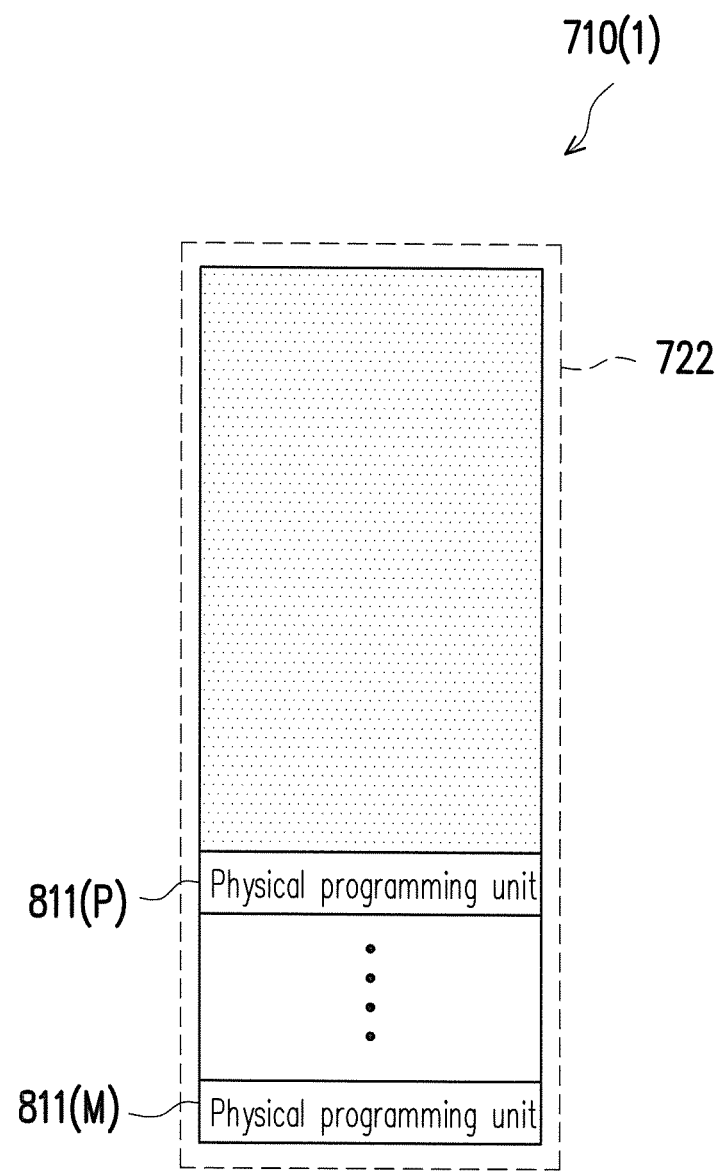
FIG. 8F is a schematic diagram illustrating a data merging operation according to another exemplary embodiment of the disclosure.

FIG. 8F is a schematic diagrams illustrating a data merging operation according to another exemplary embodiment of the disclosure.

Referring to FIG. 8F, in an exemplary embodiment, the valid data 701 originally stored in the PU 710(2) is completely stored into the space 722 (i.e., it is ensured that the PU 710(2) can be erased), so that no extra space is need to be reserved for the valid data of the PU 710(2). Thus, the space 721 will no longer exist and the capacity of the space 722 may be correspondingly adjusted to be equal to the total capacity of the PU 710(1), as shown in FIG. 8F.

It is noted that, in an exemplary embodiment in FIG. 8F, the space 722 may also include the remaining available PPUs 811(P) to 811(M) in the PU 710(1). For example, the PPUs 811(P) to 811(M) may be subsequently used to store data from the PU 710(3) (i.e., data not yet collected in the valid data 703). Alternatively, the valid data stored in other PUs may be also stored into the PPUs 811(P) to 811(M) to increase the efficiency of the data merging operation.

Figure 8G:
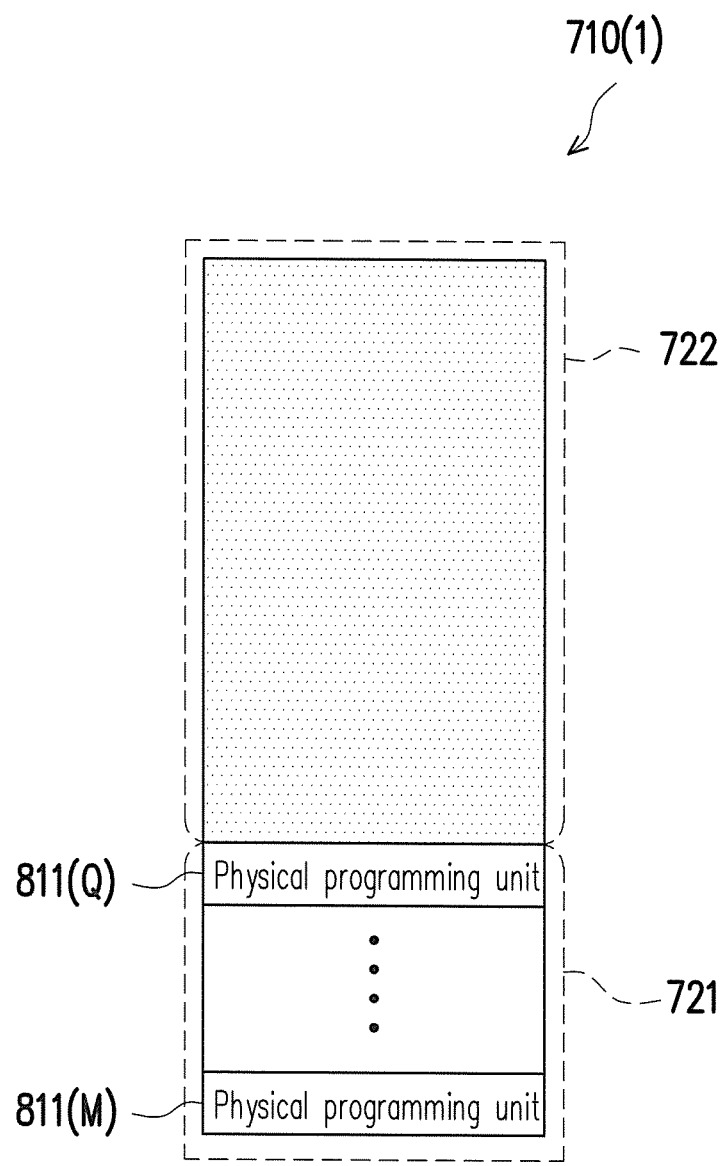
FIG. 8G is a schematic diagram illustrating a data merging operation according to another exemplary embodiment of the disclosure.

FIG. 8G is a schematic diagrams illustrating a data merging operation according to another exemplary embodiment of the disclosure.

Referring to FIG. 8G, in an exemplary embodiment, it is assumed that the space 722 is filled and at least part of valid data 701 is not yet stored into PU 710(1), the MMC 502 may continue to collect the valid data from the PU 710(2) and store the collected data into the space 721. At the same time, the MMC 502 may stop storing data from the PU 710(3) into the space 721 to ensure that the space 721 is sufficient for storing the remaining valid data in the PU 710(2). The PU 710(2) may be erased after the remaining valid data in the PU 710(2) are completely stored to the space 721 (e.g., the PPUs 811(Q) to 811(M)).

Figure 8H:
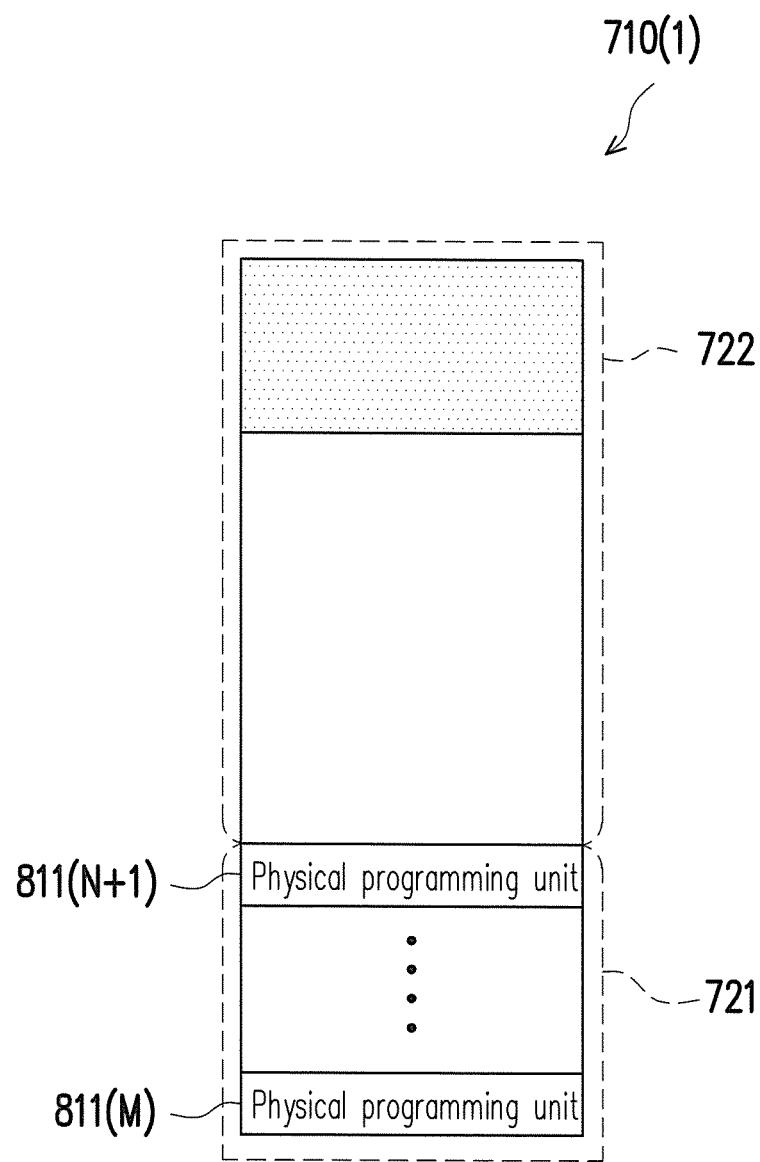
FIG. 8H is a schematic diagram illustrating a data merging operation according to another exemplary embodiment of the disclosure.

FIG. 8H is a schematic diagrams illustrating a data merging operation according to another exemplary embodiment of the disclosure.

Referring to FIG. 8H, in an exemplary embodiment, the capacity of the space 721 may also be unchanged after at least part of data from the PU 710(2) (e.g., at least part of data of the valid data 701) is stored to the space 722. For example, it is assumed that the space 721 includes the PPUs 811(N+1) to 811(M) currently. The space 721 is still maintained at including the PPUs 811(N+1) to 811(M) in response to the fact that at least part of the data from the PU 710(2) is stored into at least one PPU belonging to the space 722. For example, the MMC 502 may maintain the capacity of the space 721 by not moving the index 730.

As described above, in the data merging operation, the reserved first space may ensure that the valid data stored in the second PU among the source nodes can be completely stored into the recycling node. Then, the second PU may be erased and released as a new spare PU. It is noted that, although the first PU, the second PU and the third PU are all examples of a single PU in the exemplary embodiment of FIG. 7, in another exemplary embodiment, any of the first PU, the second PU and the third PU may include more than one PU. For example, if the second PU includes a plurality of PUs and the total data volume of the valid data stored in the second PU is not larger than the capacity of the first PU as the recycling node, the executed data merging operation can ensure that the valid data stored in the second PU could be completely stored to the first PU. Then, a plurality of PUs belonging to the second PU can be erased and released as the new spare PUs. In addition, the exemplary embodiments of FIGS. 8A-8H may be separate example embodiments or at least two of them may be sequenced in time, and the present disclosure is not limited thereto.

Figure 9:
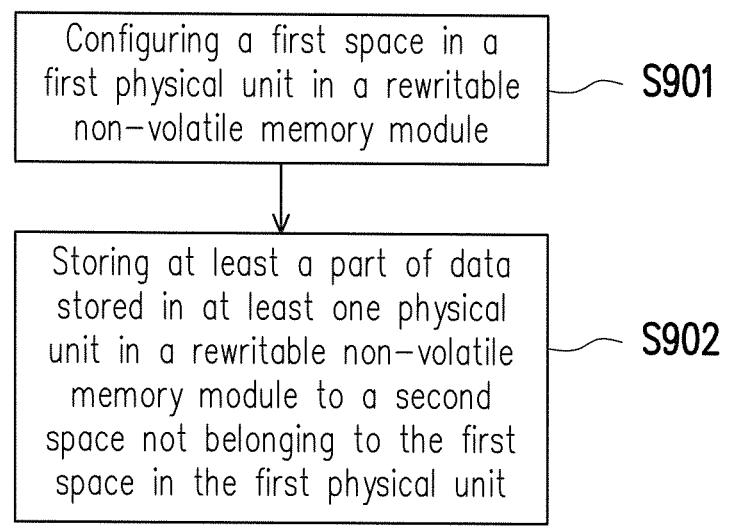
FIG. 9 is a flowchart illustrating a data storage method according to an exemplary embodiment of the disclosure.

FIG. 9 is a flowchart illustrating a data storage method according to an exemplary embodiment of the disclosure.

Referring to FIG. 9, in step S901, a first space in a first PU of a RNVM module is configured. In step S902, at least part of data stored in at least one PU of the RNVM module is stored to a second space in the first PU, wherein the second space is not belonging to the first space. It is noted that, the first space is for ensuring that a valid data stored in at least one second PU among the at least one PU can be stored to the first PU completely.

Figure 10:
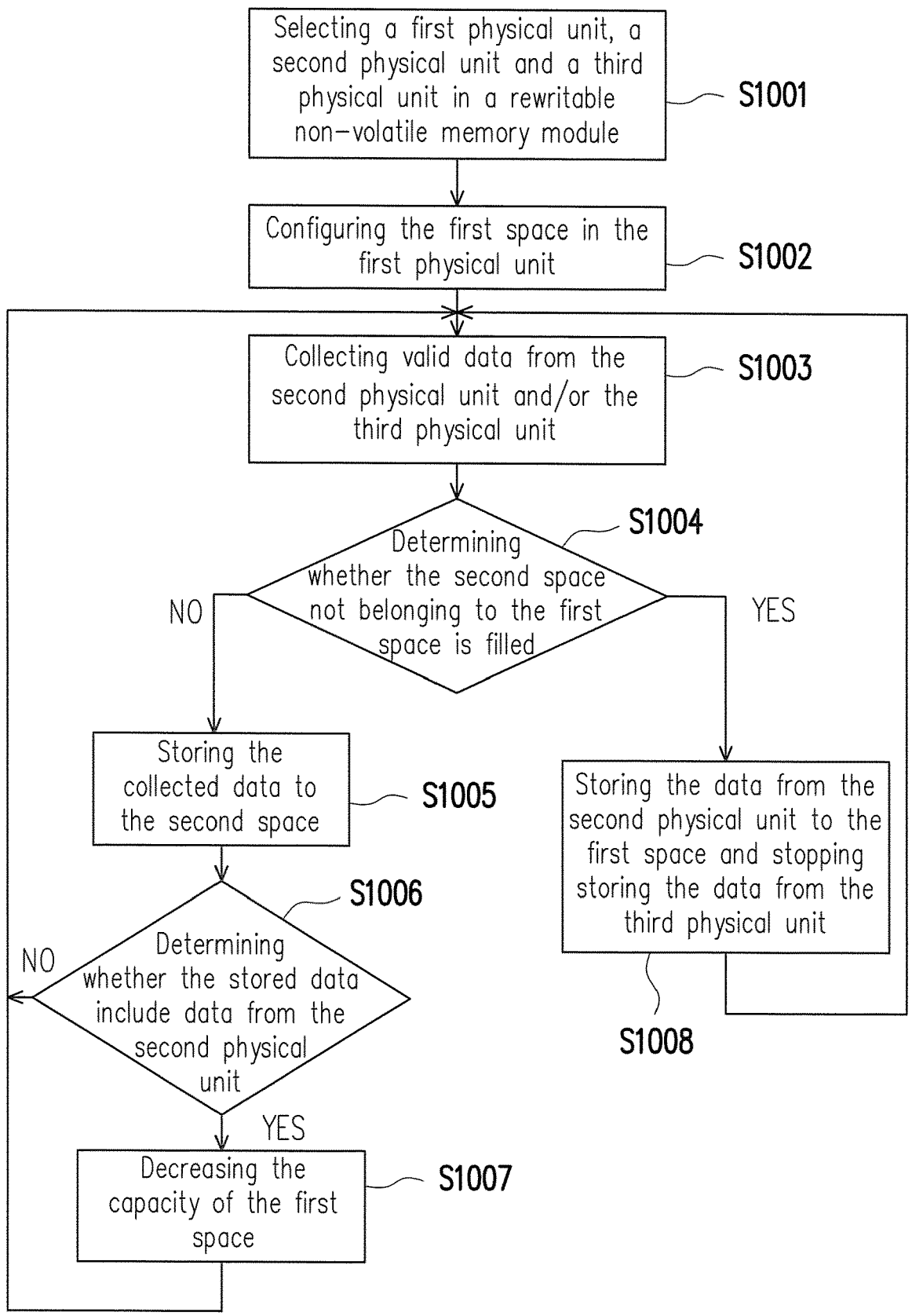
FIG. 10 is a flowchart illustrating a data storage method according to another exemplary embodiment of the disclosure.

FIG. 10 is a flowchart illustrating a data storage method according to another exemplary embodiment of the disclosure.

Referring to FIG. 10, in step S1001, a first PU, a second PU and a third PU in a RNVM module are selected, wherein the first PU serves as a recycling node and the second PU and the third PU serve as source nodes. In addition, the number of the first PU, the second PU and the third PU may be one or more, respectively. In step S1002, a first space in the first PU is configured. In step S1003, valid data is collected from the second PU and/or the third PU. In step S1004, it is determined whether a second space, not belonging to the first space, in the first PU is filled. In step S1005, the collected data is stored to the second space if the second space is not filled. In step S1006, it is determined whether the stored data include data from the second PU. In step S1007, the capacity of the first space is decreased if the stored data include data from the second PU. The capacity of the first space is not changed if the stored data does not include data from the second PU. After steps S1006 and S1007, the process returns to step S1003. In addition, if the determined result in step S1004 is YES (i.e., the second space is filled), in step S1008, the data from the second PU is stored to the first space and the data from the third PU is stopped being stored. It is noted that, in another exemplary embodiment of FIG. 10, In step S1007, even if the stored data include data from the second PU, the capacity of the first space may be maintained without being changed (e.g., the capacity of the first space may not be reduced).

Nevertheless, steps depicted in FIG. 9 and FIG. 10 are described in detail as above so that related description thereof is omitted hereinafter. It should be noted that, the steps depicted in FIG. 9 and FIG. 10 may be implemented as a plurality of program codes or circuits, which are not particularly limited in the disclosure. Moreover, the method of FIG. 9 and FIG. 10 may be implemented by reference with above exemplary embodiments, or may be implemented separately, which are not particularly limited in the disclosure. To sum up, it is ensured that at least one spare PU of the memory storage device can be released in a data merging operation of multiple source nodes in the present disclosure.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A data storage method for a rewritable non-volatile memory module comprising a plurality of physical units, the data storage method comprising:

configuring a first space in a first physical unit among the physical units; and storing at least part of data stored in at least one physical unit among the physical units to a second space in the first physical unit, wherein the second space is not belonging to the first space, wherein an initial capacity of the first space is configured according to a total data volume of valid data stored in at least one second physical unit for ensuring that the valid data stored in the at least one second physical unit among the at least one physical unit is to be stored to the first physical unit, wherein the total data volume of the valid data stored in the at least one second physical unit is consistent with the initial capacity of the first space.

2. The data storage method as claimed in claim 1 further comprising:

adjusting a capacity of the first space from a first capacity to a second capacity if the at least part of data comprise a first data from the at least one second physical unit, wherein the second capacity is less than the first capacity.

3. The data storage method as claimed in claim 2, wherein a difference value between the first capacity and the second capacity is consistent with a data volume of the first data.

4. The data storage method as claimed in claim 1, wherein a capacity of the first space is positively relative to the total data volume of the valid data, not yet stored to the first physical unit, in the at least one second physical unit.

5. The data storage method as claimed in claim 1 further comprising:

not adjusting a capacity of the first space if the at least part of data does not comprise a first data from the at least one second physical unit.

6. The data storage method as claimed in claim 1 further comprising:
storing a remaining data from the at least one second physical unit to the first space and not storing data from a third physical unit among the at least one physical unit to the first space if the second space is filled with the at least part of data.

7. The data storage method as claimed in claim 1 further comprising:
not adjusting a capacity of the first space if the at least part of data comprise a first data from the at least one second physical unit.

8. A memory storage device comprising:
a connection interface unit, configured to couple to a host system;
a rewritable non-volatile memory module, comprising a plurality of physical units; and
a memory control circuit unit, coupled to the connection interface unit and the rewritable non-volatile memory module,
wherein the memory control circuit unit is configured to configure a first space in a first physical unit among the physical units,
wherein the memory control circuit unit is further configured to issue a first write command sequence which instructs to store at least part of data stored in at least one physical unit among the physical units to a second space in the first physical unit, wherein the second space is not belonging to the first space,
wherein an initial capacity of the first space is configured according to a total data volume of valid data stored in at least one second physical unit for ensuring that the valid data stored in the at least one second physical unit among the at least one physical unit is to be stored to the first physical unit,
wherein the total data volume of the valid data stored in the at least one second physical unit is consistent with the initial capacity of the first space.

9. The memory storage device as claimed in claim 8, wherein the memory control circuit unit is further configured to adjust a capacity of the first space from a first capacity to a second capacity if the at least part of data comprise a first data from the at least one second physical unit, wherein the second capacity is less than the first capacity.

10. The memory storage device as claimed in claim 9, wherein a difference value between the first capacity and the second capacity is consistent with a data volume of the first data.

11. The memory storage device as claimed in claim 8, wherein a capacity of the first space is positively relative to the total data volume of the valid data, not yet stored to the first physical unit, in the at least one second physical unit.

12. The memory storage device as claimed in claim 8, wherein the memory control circuit unit is further configured not to adjust a capacity of the first space if the at least part of data does not comprise a first data from the at least one second physical unit.

13. The memory storage device as claimed in claim 8, wherein the memory control circuit unit is further configured to issue at least one second write command sequence which instructs to store a remaining data from the at least one second physical unit to the first space and not to store data from a third physical unit among the at least one physical unit to the first space if the second space is filled with the at least part of data.

14. The memory storage device as claimed in claim 8, wherein the memory control circuit unit is further configured not to adjust a capacity of the first space if the at least part of data comprise a first data from the at least one second physical unit.

15. A memory control circuit unit for controlling a rewritable non-volatile memory module comprising a plurality of physical units, and the memory control circuit unit comprising:
a host interface, configured to couple to a host system;
a memory interface, configured to couple to the rewritable non-volatile memory module; and
a memory management circuit, coupled to the host interface and the memory interface,
wherein the memory management circuit is configured to configure a first space in a first physical unit among the physical units,
wherein the memory management circuit is further configured to issue a first write command sequence which instructs to store at least part of data stored in at least one physical unit among the physical units to a second space in the first physical unit, wherein the second space is not belonging to the first space,
wherein an initial capacity of the first space is configured according to a total data volume of valid data stored in at least one second physical unit for ensuring that the valid data stored in the at least one second physical unit among the at least one physical unit is to be stored to the first physical unit, wherein the total data volume of the valid data stored in the at least one second physical unit is consistent with the initial capacity of the first space.

16. The memory control circuit unit as claimed in claim 15, wherein the memory management circuit is further configured to adjust a capacity of the first space from a first capacity to a second capacity if the at least part of data comprise a first data from the at least one second physical unit, wherein the second capacity is less than the first capacity.

17. The memory control circuit unit as claimed in claim 16, wherein a difference value between the first capacity and the second capacity is consistent with a data volume of the first data.

18. The memory control circuit unit as claimed in claim 15, wherein a capacity of the first space is positively relative to the total data volume of the valid data, not yet stored to the first physical unit, in the at least one second physical unit.

19. The memory control circuit unit as claimed in claim 15, wherein the memory management circuit is further configured not to adjust a capacity of the first space if the at least part of data does not comprise a first data from the at least one second physical unit.

20. The memory control circuit unit as claimed in claim 15, wherein the memory management circuit is further configured to issue at least one second write command sequence which instructs to store a remaining data from the at least one second physical unit to the first space and not to store data from a third physical unit among the at least one physical unit to the first space if the second space is filled with the at least part of data.

21. The memory control circuit unit as claimed in claim 15, wherein the memory management circuit is further configured not to adjust a capacity of the first space if the at least part of data comprise a first data from the at least one second physical unit.

* * * * *